United States Patent
Patil et al.

(10) Patent No.: US 10,409,734 B1
(45) Date of Patent: Sep. 10, 2019

(54) SYSTEMS AND METHODS FOR CONTROLLING AUXILIARY DEVICE ACCESS TO COMPUTING DEVICES BASED ON DEVICE FUNCTIONALITY DESCRIPTORS

(71) Applicant: Symantec Corporation, Mountain View, CA (US)

(72) Inventors: Deepak Patil, Pune (IN); Atish Bhowmick, Pune (IN)

(73) Assignee: Symantec Corporation, Mountain View, CA (US)

(*) Notice: Subject to any disclaimer, the term of this patent is extended or adjusted under 35 U.S.C. 154(b) by 214 days.

(21) Appl. No.: 15/469,608

(22) Filed: Mar. 27, 2017

(51) Int. Cl.
    *G06F 13/10*     (2006.01)
    *G06F 13/38*     (2006.01)
    *G06F 13/42*     (2006.01)

(52) U.S. Cl.
CPC .......... *G06F 13/102* (2013.01); *G06F 13/385* (2013.01); *G06F 13/4282* (2013.01);
(Continued)

(58) Field of Classification Search
CPC .............. G06Q 20/223; G06Q 20/3829; H04L 9/0637; H04L 9/0861; H04L 9/32; H04L 3/3252; G06F 21/44; G06F 21/629; G06F 21/70; G06F 2221/2107; G06F 2221/2141; G06F 9/4413; G06F 9/45537; G06F 9/4411; G06F 9/4415; G06F 9/451; G06F 9/44526; G06F 9/5055; G06F 9/54; G06F 13/102; G06F 13/385; G06F 13/4282; G06F 13/42; G06F 13/4208; G06F 2213/0042; G06F 2213/38; G06F 2213/3812
(Continued)

(56) References Cited

U.S. PATENT DOCUMENTS 6,556,219 B1 * 4/2003 Wugofski ........... H04L 12/2805
    386/E5.07
7,240,215 B2 * 7/2007 Cabezas .................. G06F 21/80
    713/168
(Continued)

OTHER PUBLICATIONS

USB Filter (Industry 8.1); Jul. 8, 2014; https://msdn.microsoft.com/en-us/library/dn449350%28v=winembedded.82%29.aspx; as accessed Mar. 16, 2017.
(Continued)

*Primary Examiner* — Kambiz Zand
*Assistant Examiner* — Mahabub S Ahmed
(74) *Attorney, Agent, or Firm* — FisherBroyles, LLP

(57) ABSTRACT

The disclosed computer-implemented method for controlling auxiliary device access to computing devices based on device functionality descriptors may include (i) detecting a connection of an auxiliary device to a client computing device, (ii) receiving a set of functionality descriptors from the auxiliary device, each functionality descriptor of the set of functionality descriptors identifying a separate functionality of the auxiliary device, (iii) determining whether the set of functionality descriptors matches a set of reference descriptors, and (iv) performing a security action based on the determination of whether the set of functionality descriptors matches the set of reference descriptors. Various other methods, systems, and computer-readable media are also disclosed.

20 Claims, 6 Drawing Sheets

(52) U.S. Cl.
CPC .......... *G06F 13/4295* (2013.01); *G06F 13/42* (2013.01); *G06F 13/4208* (2013.01); *G06F 2213/0042* (2013.01); *G06F 2213/38* (2013.01); *G06F 2213/3812* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 7,853,725 B2* | 12/2010 | Desai | ................... | G06F 3/0604 710/36 |
| 8,230,149 B1* | 7/2012 | Long | ....................... | G06F 21/85 710/305 |
| 8,533,829 B2* | 9/2013 | Wei | ..................... | H04L 63/1408 709/219 |
| 8,862,803 B2* | 10/2014 | Powers | ................ | G06F 13/385 710/306 |
| 9,588,775 B2* | 3/2017 | Scales | .................. | G06F 13/426 |
| 2002/0133694 A1* | 9/2002 | Ray | ....................... | G06F 9/4411 713/1 |
| 2004/0254014 A1* | 12/2004 | Quraishi | ................ | G07F 17/32 463/29 |
| 2005/0251596 A1* | 11/2005 | Maier | ................... | G06F 9/4411 710/74 |
| 2006/0101182 A1* | 5/2006 | Drabczuk | ............ | G06F 9/4411 710/300 |
| 2006/0200253 A1* | 9/2006 | Hoffberg | ................ | G05B 15/02 700/19 |
| 2008/0005560 A1* | 1/2008 | Duffus | ................. | G06F 21/629 713/164 |
| 2008/0168188 A1* | 7/2008 | Yue | ......................... | G06F 9/445 710/15 |
| 2008/0318629 A1* | 12/2008 | Inha | .................... | H04M 1/6058 455/557 |
| 2009/0222814 A1* | 9/2009 | Astrand | ................ | G06F 9/4413 718/1 |
| 2011/0246756 A1* | 10/2011 | Smith | .................... | H04L 9/3252 713/2 |
| 2012/0036016 A1* | 2/2012 | Hoffberg | ................ | G05B 15/02 705/14.58 |
| 2013/0145061 A1* | 6/2013 | Parivar | .................... | G06F 9/454 710/67 |
| 2013/0225439 A1* | 8/2013 | Princen | ................ | C12Q 1/6883 506/9 |
| 2014/0082235 A1* | 3/2014 | Kaushik | ................ | G06F 13/102 710/62 |
| 2014/0188904 A1* | 7/2014 | Sciuk | .................. | G06Q 30/0633 707/749 |
| 2015/0379430 A1* | 12/2015 | Dirac | .................... | G06N 99/005 706/12 |
| 2016/0077982 A1* | 3/2016 | Ding | ..................... | G06F 13/102 710/313 |
| 2016/0112421 A1* | 4/2016 | Wang | ...................... | G06F 21/44 726/9 |
| 2017/0068227 A1* | 3/2017 | Jose | ........................ | G05B 15/02 |
| 2019/0050607 A1* | 2/2019 | Halim | ..................... | G06F 13/42 |

OTHER PUBLICATIONS

USB Class Codes; Jun. 15, 2016; http://www.usb.org/developers/defined_class; as accessed Mar. 16, 2017.

System-Defined Device Setup Classes; https://msdn.microsoft.com/en-in/library/windows/hardware/ff553419%28v=vs.85%29.aspx; as accessed Mar. 16, 2017.

USB in a Nutshell—Chapter 5—USB Descriptors; Sep. 17, 2010; http://www.beyondlogic.org/usbnutshell/usb5.shtml#InterfaceDescriptors; as accessed Mar. 16, 2017.

USB Made Simple—Part 4—Protocol; Mar. 14, 2007; http://www.usbmadesimple.co.uk/ums_4.htm; as accessed Mar. 16, 2017.

How to get USB descriptors (Windows Store app); Jul. 19, 2013; https://msdn.microsoft.com/en-us/library/windows/hardware/dn303344(v=vs.85).aspx; as accessed Mar. 16, 2017.

Rachana Bedekar, et al.; Systems and Methods for Preventing Unauthorized Access to Computing Devices Implementing Computer Accessibility Services; U.S. Appl. No. 15/277,597, filed Sep. 27, 2016.

* cited by examiner

SYSTEMS AND METHODS FOR CONTROLLING AUXILIARY DEVICE ACCESS TO COMPUTING DEVICES BASED ON DEVICE FUNCTIONALITY DESCRIPTORS

BACKGROUND

People are becoming more aware of information security risks presented in today's highly connected world. Identity theft affects a rising number of individuals and newspaper headlines are frequently directed to high-level data hackings and leaks of non-public information. Individuals and organizations often take steps to ensure their computers and networks are secure from malicious attacks. Auxiliary devices connected to computers are also used, in many instances, to surreptitiously obtain private data. A peripheral device may, for example, be connected to a computer and utilized to obtain information from the computer without a user's knowledge. In order to prevent unauthorized connected devices from accessing and extracting data from computers, security solutions may use whitelists of device identifiers (IDs) for authorized devices.

However, various auxiliary devices, including composite devices having multiple possible configurations, may be easily spoofed such that they present false device IDs, such as product IDs and vendor IDs, to connected computers. In some cases, an auxiliary device may have both a valid configuration and a malicious configuration. When the auxiliary device is connected to a computer, the auxiliary device may present a product ID indicating that the auxiliary device is, for example, a webcam having a configuration with no data storage capabilities. Once the auxiliary device is connected to the computer, a malicious interface not indicated by the product ID may be used by the auxiliary device to obtain and store data from the connected computer. Such unauthorized access to data may be costly and time-consuming to address. Additionally, sensitive information may be obtained and utilized by malicious parties, resulting in unrecoverable losses to individuals and organizations. The instant disclosure, therefore, identifies and addresses a need for systems and methods for controlling auxiliary device access to computing devices based on device functionality descriptors.

SUMMARY

As will be described in greater detail below, the instant disclosure describes various systems and methods for controlling auxiliary device access to computing devices based on device functionality descriptors.

In one example, a computer-implemented method for controlling auxiliary device access to computing devices based on device functionality descriptors may include (i) detecting, at the client computing device, a connection of an auxiliary device to the client computing device, (ii) receiving, at the client computing device, a set of functionality descriptors from the auxiliary device, each functionality descriptor of the set of functionality descriptors identifying a separate functionality of the auxiliary device, (iii) determining, at the client computing device, whether the set of functionality descriptors matches a set of reference descriptors, and (iv) performing, at the client computing device, a security action based on the determination of whether the set of functionality descriptors matches the set of reference descriptors.

In some embodiments, the computer-implemented method may further include receiving, at the client computing device, a device identifier from the auxiliary device. The computer-implemented may additionally include (i) selecting, at the client computing device, a driver based on the device identifier, and (ii) sending, from the client computing device, a command from the driver to the auxiliary device requesting the set of functionality descriptors from the auxiliary device. Receiving the set of functionality descriptors from the auxiliary device may include receiving, at the client computing device, the set of functionality descriptors in response to the command. The driver may include a kernel-mode filter driver. The device identifier may include at least one of a vendor identifier, a product identifier, and a device class identifier. The device identifier may be mapped to a corresponding entity that is recognizable by an operating system of the client computing device. The set of reference descriptors may correspond to the device identifier. In various embodiments, each functionality descriptor of the set of functionality descriptors may include an interface descriptor for the auxiliary device. Each functionality descriptor of the set of functionality descriptors may include a class code according to at least one of a specification and a standard for the auxiliary device. For example, the class code may include a universal serial bus class code corresponding to a universal serial bus standard for the auxiliary device.

In at least one embodiment, determining whether the set of functionality descriptors matches the set of reference descriptors may further include determining, at the client computing device, that the set of functionality descriptors does not match the set of reference descriptors, and performing the security action may further include preventing, at the client computing device, the auxiliary device from interfacing with the client computing device based on the determination that the set of functionality descriptors does not match the set of reference descriptors. Preventing the auxiliary device from interfacing with the client computing device may further include preventing, at the client computing device, a function driver of the client computing device from interfacing with the auxiliary device.

In some embodiments, determining whether the set of functionality descriptors matches the set of reference descriptors may further include determining, at the client computing device, that the set of functionality descriptors matches the set of reference descriptors, and performing the security action may further include allowing, at the client computing device, the auxiliary device to interface with the client computing device based on the determination that the set of functionality descriptors matches the set of reference descriptors. The computer-implemented method may further include (i) receiving, at the client computing device, a set of subsequent functionality descriptors from the auxiliary device, each subsequent functionality descriptor of the set of subsequent functionality descriptors identifying a separate functionality of the auxiliary device, (ii) determining, at the client computing device, whether the set of subsequent functionality descriptors matches the set of reference descriptors, and (iii) performing, at the client computing device, an additional security action based on the determination of whether the set of subsequent functionality descriptors matches the set of reference descriptors.

Determining whether the set of subsequent functionality descriptors matches the set of reference descriptors may further include determining, at the client computing device, that the set of subsequent functionality descriptors does not match the set of reference descriptors, and performing the security action may further include preventing, at the client computing device, the auxiliary device from interfacing with the client computing device based on the determination that the set of subsequent functionality descriptors does not match the set of reference descriptors. In some embodiments, the computer-implemented method may further include sending, from the client computing device, a command to the auxiliary device requesting the set of functionality descriptors from the auxiliary device. Receiving the set of functionality descriptors from the auxiliary device may include receiving, at the client computing device, the set of functionality descriptors in response to the command In one embodiment, a system for controlling auxiliary device access to computing devices based on device functionality descriptors may include several modules stored in memory, including (i) a detection module, stored in memory, that detects, at a client computing device, a connection of an auxiliary device to the client computing device, (ii) a communication module, stored in memory, that receives at the client computing device, a set of functionality descriptors from the auxiliary device, each functionality descriptor of the set of functionality descriptors identifying a separate functionality of the auxiliary device, (iii) a determination module, stored in memory, that determines, at the client computing device, whether the set of functionality descriptors matches a set of reference descriptors, (iv) a security module, stored in memory, that performs, at the client computing device, a security action based on the determination of whether the set of functionality descriptors matches the set of reference descriptors, and (v) at least one physical processor that executes the detection module, the communication module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, at the client computing device, a connection of an auxiliary device to the client computing device, (ii) receive, at the client computing device, a set of functionality descriptors from the auxiliary device, each functionality descriptor of the set of functionality descriptors identifying a separate functionality of the auxiliary device, (iii) determine, at the client computing device, whether the set of functionality descriptors matches a set of reference descriptors, and (iv) perform, at the client computing device, a security action based on the determination of whether the set of functionality descriptors matches the set of reference descriptors.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
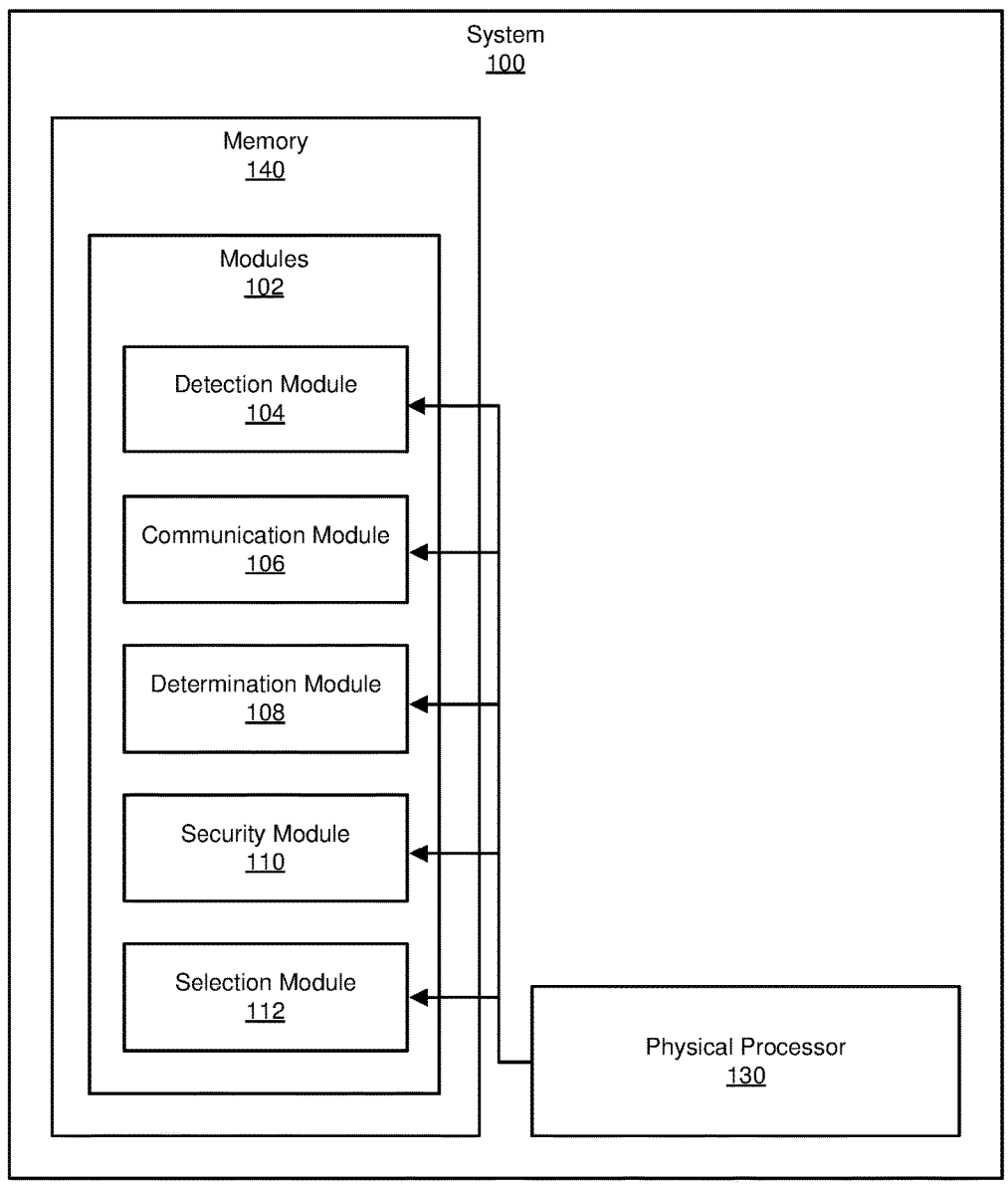
FIG. 1 is a block diagram of an example system for controlling auxiliary device access to computing devices based on device functionality descriptors.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling auxiliary device access to computing devices based on device functionality descriptors. As will be explained in greater detail below, by identifying auxiliary devices based on functionality descriptors for the auxiliary devices, the systems and methods described herein may enable protection of client computing devices from loss of sensitive data to malicious devices that may appear to be legitimate auxiliary devices. The systems and methods described herein may improve the functioning of client computing devices by allowing legitimate auxiliary devices to interface with the client computing devices while blocking unauthorized auxiliary devices that may be used to obtain data without a user's knowledge. These systems and methods may accordingly improve the security of client computing devices and reduce data losses to malicious parties. Additionally, the disclosed systems and methods may safeguard client computing devices from malicious attacks without resorting to blocking all auxiliary device connections through physical locks and blocking software, which would negatively impact the usability of the computing devices and result in significantly reduced user experiences. The systems and methods described herein may further provide granular control over connections of composite device having multiple configurations.

Figure 2:
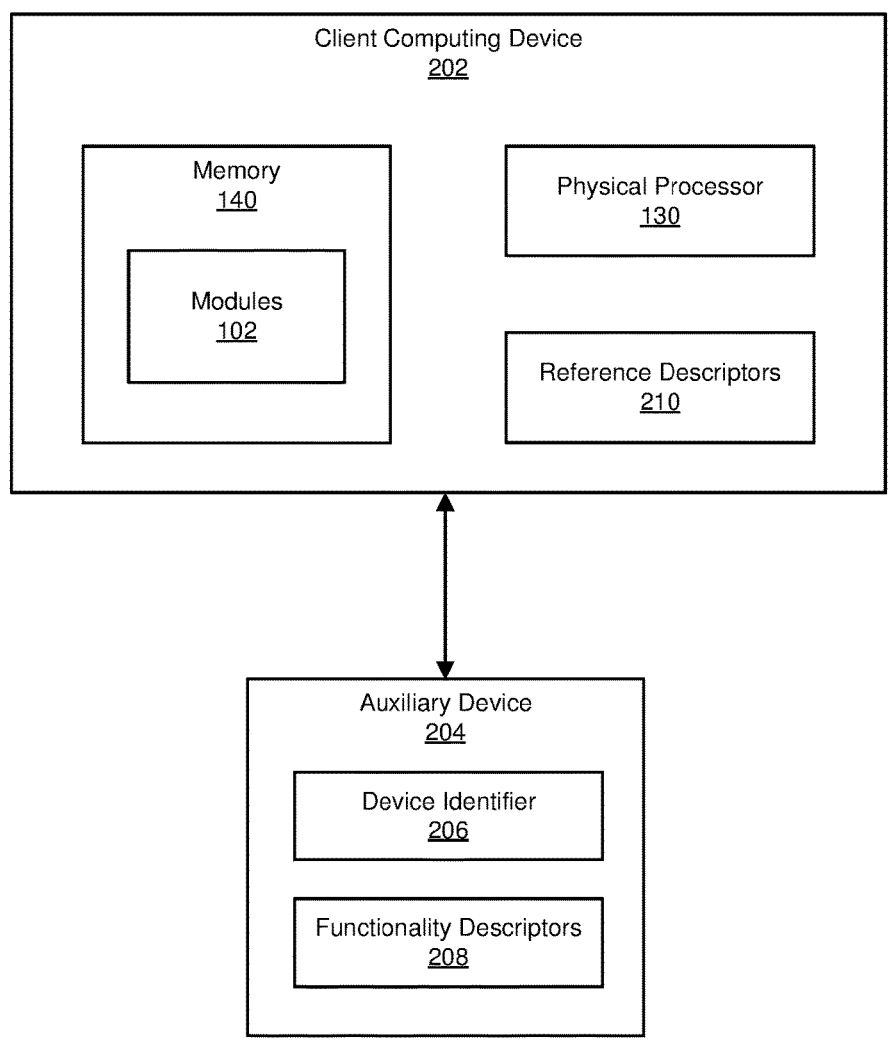
FIG. 2 is a block diagram of an additional example system for controlling auxiliary device access to computing devices based on device functionality descriptors.
Figure 3:
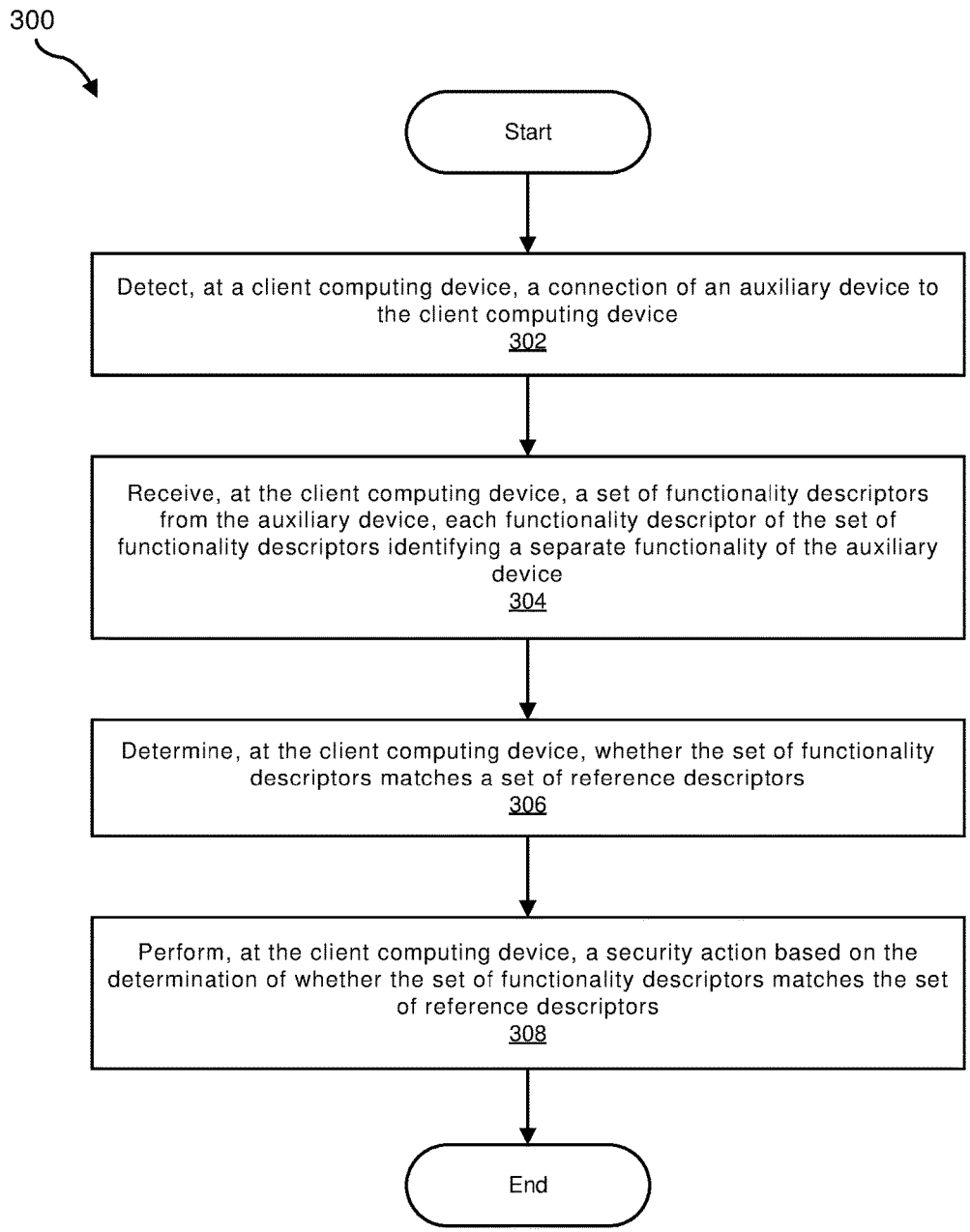
FIG. 3 is a flow diagram of an example method for controlling auxiliary device access to computing devices based on device functionality descriptors.
Figure 4:
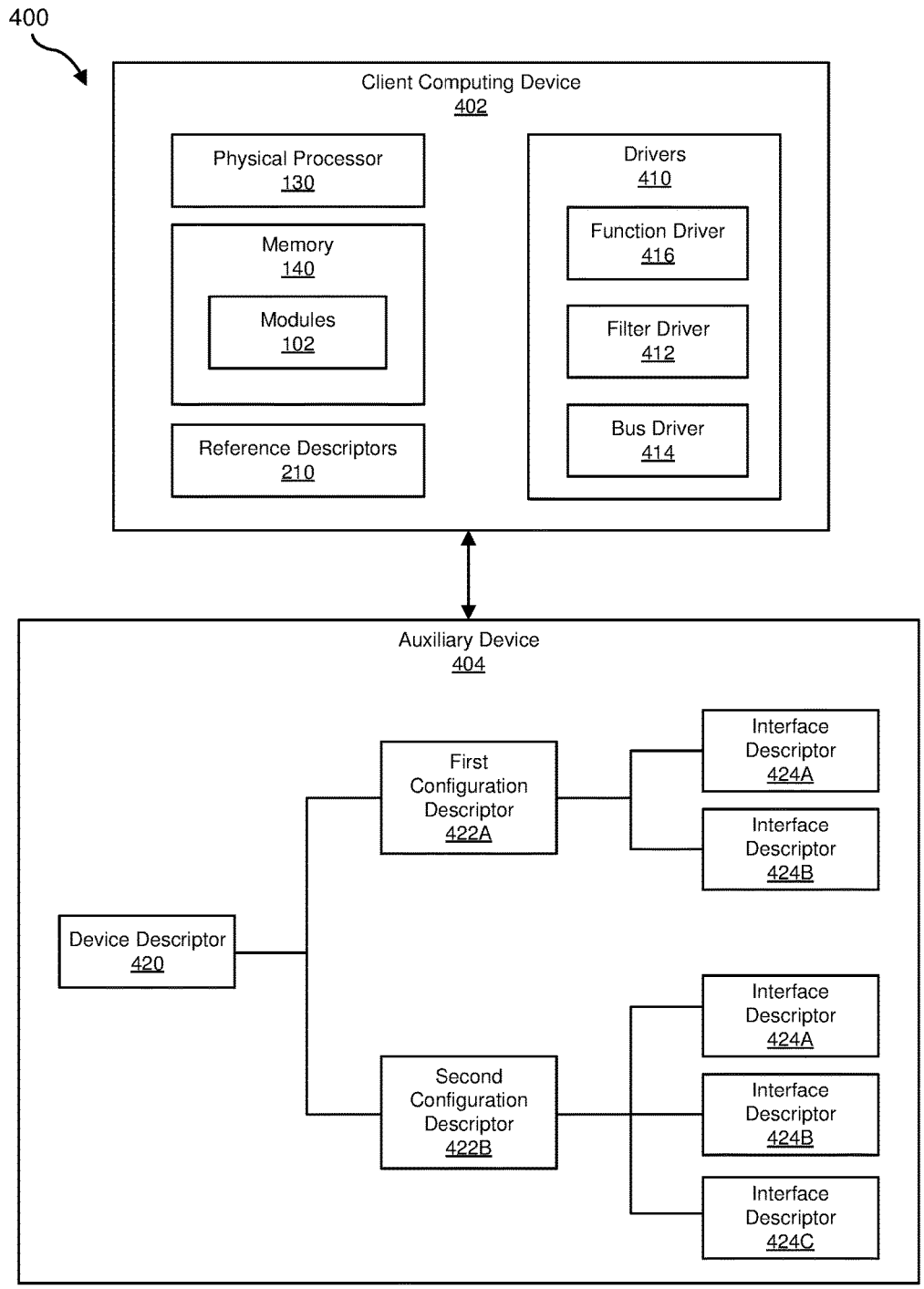
FIG. 4 is a block diagram of an additional example system for controlling auxiliary device access to computing devices based on device functionality descriptors.

The following will provide, with reference to FIGS. 1-2 and 4, detailed descriptions of example systems for controlling auxiliary device access to computing devices based on device functionality descriptors. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for controlling auxiliary device access to computing devices based on device functionality descriptors. As illustrated in this figure, example system 100 may include one or more modules 102 for performing one or more tasks. For example, and as will be explained in greater detail below, example system 100 may include a detection module 104 that detects a connection of an auxiliary device to a client computing device. Example system 100 may also include a communication module 106 that receives a set of functionality descriptors from the auxiliary device, each functionality descriptor of the set of functionality descriptors identifying a separate functionality of the auxiliary device.

The term "functionality descriptor," as used herein, generally refers to a descriptor that is used to convey, to a host computing device, information concerning one or more functionalities of a device, such as an auxiliary or peripheral device, that is connected to the host computing device. The functionality descriptor may include header information describing characteristics of a functional grouping of the connected auxiliary device, such as a grouping of endpoints, that work together to perform a feature of the auxiliary device. In at least one embodiment, a functionality descriptor may include a class code according to at least one of a specification and a standard for the auxiliary device (e.g., a universal serial bus (USB) class code corresponding to a USB standard for the auxiliary device, etc.). For example, a functionality descriptor for an auxiliary device that is connected to the host computing device via a USB port (e.g., USB-A, USB-B, USB-C, micro-USB, mini-USB, etc.) may include a USB interface descriptor and/or a device descriptor that indicates a class code, a subclass code, a protocol code, a string descriptor, and/or an indication of the number of endpoints within an interface grouping of the auxiliary device, according to a USB standard for the auxiliary device. Functionality descriptors may be passed from the auxiliary device to the connected host computing device. In some embodiments, functionality descriptors for auxiliary devices connected to a host computing device via non-USB connection ports (e.g., high-definition multimedia interface (HDMI) port, digital visual interface (DVI) port, video graphics array (VGA) port, parallel port, serial port, DISPLAYPORT, PS/2, etc.) and/or wireless protocols (e.g., 802.11a/b/g/n, BLUETOOTH, infrared data association (IRDA), etc.) may also be passed from the auxiliary devices to the host computing device.

Example system 100 may additionally include a determination module 108 that determines whether the set of functionality descriptors matches a set of reference descriptors. Example system 100 may further include a security module 110 that performs a security action based on the determination of whether the set of functionality descriptors matches the set of reference descriptors. Example system 100 may also include a selection module 112 that selects a driver based on the device identifier.

A "driver" or "device driver," as used herein, generally refers to a computer program providing a software interface between a host computing device and a connected hardware device, such as an auxiliary device. A driver may communicate with the connected auxiliary device through a computer bus or communications subsystem and may be invoked by the host computing device operating system via a callback (i.e., a synchronous callback or an asynchronous callback). For example, one or more routines in a driver may be invoked by a calling program on the host computing device, and the invoked routines may issue commands to the connected auxiliary device. In response to receiving data from the connected auxiliary device, the driver may invoke one or more routines in the calling program on the host computing device. A host computing device may include various types of drivers for interfacing with connected auxiliary devices, including multiple drivers and types of drivers for a particular connected auxiliary device, including bus drivers, function drivers, and filter drivers. Various drivers may run in either kernel-mode or in user-mode, or separately as loadable modules (e.g., a loadable kernel module).

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIGS. 2 and 4 (e.g., client computing device 202 and/or client computing device 402). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling auxiliary device access to computing devices based on device functionality descriptors. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2 and/or example system 400 in FIG. 4. As shown in FIG. 2, system 200 may include a client computing device 202 in communication with a connected auxiliary device 204 via any suitable port (e.g., USB-A, USB-B, USB-C, micro-USB, mini-USB, HDMI, DVI, VGA, DISPLAYPORT, PS/2, parallel port, serial port, etc.) and/or wireless connection protocol (e.g., 802.11a/b/g/n, BLUETOOTH, IRDA, etc.). In one example, all or a portion of the functionality of modules 102 may be performed by client computing device 202 and/or any other suitable computing system. Client computing device 202 may include reference descriptors 210, which may be used to identify an auxiliary device, such as auxiliary device 204, connected to client computing device 202. For example, a set of reference descriptors 210 may be used for comparison with a set of functionality descriptors 208 received from connected auxiliary device 204. Reference descriptors 210 may include one or more sets of reference descriptors 210, each of the sets of reference descriptors 210 corresponding to a different auxiliary device or type of auxiliary device. Auxiliary device 204 may include a device identifier 206, such as, for example, a vendor identifier, a product identifier, a device class identifier, and/or a system-defined device setup class, for auxiliary device 204. Additionally, auxiliary device 204 may include one or more functionality descriptors 208.

As will be described in greater detail below, one or more of modules 102 from FIG. 1 may, when executed by at least one processor of client computing device 202, enable client computing device 202 to control auxiliary device access to computing devices based on device functionality descriptors. For example, and as will be described in greater detail below, one or more of modules 102 may cause client computing device 202 to (i) detect a connection of auxiliary device 204 to client computing device 202, (ii) receive a set of functionality descriptors 208 from auxiliary device 204, each functionality descriptor of the set of functionality descriptors 208 identifying a separate functionality of auxiliary device 204, (iii) determine whether the set of functionality descriptors 208 matches a set of reference descriptors 210, and (iv) perform a security action based on the determination of whether the set of functionality descriptors 208 matches the set of reference descriptors 210.

Client computing device 202 generally represents any type or form of computing device capable of reading computer-executable instructions. Examples of client computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Auxiliary device 204 generally represents any type or form of ancillary computing device and/or hardware device that is capable of connecting to client computing device 202 via a port or wireless connection protocol and interfacing with one or more drivers of client computing device 202. Auxiliary device 204 may include an input device, an output device, or an input/output device. Examples of auxiliary device 204 include, without limitation, microphones, webcams, game controllers, light pens, digital cameras, displays, printers, projectors, speakers, touchscreens, keyboards, computer mice, graphic tablets, barcode readers, card readers, smart card readers, image scanners, digital watches, smartphones, smart watches, smart glasses, fitness trackers, tablet computers, digital audio players, multimedia players, PDAs, computer readable storage devices (e.g., hard disk drives, tape drives, floppy disk drives, compact disk drives, digital video disk drives, BLU-RAY disk drives, solid-state drives, flash media drives, ZIP disk drives, SUPERDISK drives, etc.), diagnostic devices, wireless controllers, billboard devices, personal healthcare devices, hub devices, content security devices, network bridge devices, device firmware upgrade devices, testing and measurement devices, communications devices, vendor specific devices, composite devices, and/or any other suitable computing and/or hardware device.

FIG. 3 is a flow diagram of an example computer-implemented method 300 for controlling auxiliary device access to computing devices based on device functionality descriptors. The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect, at a client computing device, a connection of an auxiliary device to the client computing device. For example, detection module 104 may, as part of client computing device 202 in FIG. 2, detect a connection of auxiliary device 204 to client computing device 202.

Detection module 104 may detect the connection of auxiliary device 204 to client computing device 202 in a variety of ways. In at least one embodiment, detection module 104 may detect that auxiliary device 204 is electrically connected to client computing device 202 when a user physically plugs auxiliary device 204 into a connection port on client computing device 202. In some embodiments, detection module 104 may detect that auxiliary device 204 is attempting to wirelessly connect to client computing device 202 and may allow auxiliary device 204 to connect to client computing device 202. Data exchanged following detection of the connection of auxiliary device 204 to client computing device 202 may be limited to sending and receiving data used for purposes of identifying and/or authenticating auxiliary device 204 according to the methods and systems described herein. For example, prior to identification and/or authentication of auxiliary device 204, auxiliary device 204 may be prevented from more fully interfacing with client computing device 202 via, for example, a function driver of client computing device 202, as will be explained in greater detail below.

At step 304 in FIG. 3, one or more of the systems described herein may receive, at the client computing device, a set of functionality descriptors from the auxiliary device, each functionality descriptor of the set of functionality descriptors identifying a separate functionality of the auxiliary device. For example, communication module 106 may, as part of client computing device 202 in FIG. 2, receive a set of functionality descriptors 208 from auxiliary device 204, each functionality descriptor of the set of functionality descriptors 208 identifying a separate functionality of auxiliary device 204.

Communication module 106 may receive the set of functionality descriptors 208 from auxiliary device 204 in a variety of ways. In one embodiment, the set of functionality descriptors 208 may include one or more functionality descriptors 208 corresponding to functionalities of auxiliary device 204. Functionality descriptors 208 may each, for example, correspond to an interface and/or a group of endpoints that is configured to perform a particular function of auxiliary device 204. In at least one embodiment, each of the set of functionality descriptors 208 received by communication module 106 may include a separate interface descriptor corresponding to an interface and one or more endpoints of the interface. In various embodiments, such interface descriptors may each be described in terms of a separate class code for the corresponding interface of auxiliary device 204. For example, the set of functionality descriptors 208 received from auxiliary device 204 may include a set of class codes, such as USB class codes, corresponding to the respective interfaces of auxiliary device 204.

In some embodiments, one or more of the systems described herein may also receive, at the client computing device, a device identifier from the auxiliary device. For example, communication module 106 may, as part of client computing device 202, receive device identifier 206 from auxiliary device 204. Communication module 106 may receive device identifier 206 from auxiliary device 204 in a variety of ways. For example, when auxiliary device 204 is connected to client computing device 202, communication module 106 may send, from client computing device 202, a command to auxiliary device 204 requesting the device identifier 206. Device identifier 206 may be received by communication module 106 in response to the command. Device identifier 206 may include at least one identifier for auxiliary device 204. For example, device identifier 206 may include, without limitation, at least one of a vendor identifier, a product identifier, and a device class identifier. In some embodiments, device identifier 206 may be mapped to a corresponding entity that is recognizable by an operating system (e.g., WINDOWS, LINUX, MAC OS, ANDROID, etc.) of client computing device 202. For example, in WINDOWS, device identifier 206 may be mapped to a system-defined device setup class as specified by MICROSOFT.

In at least one embodiment, device identifier 206 may be used to determine, at least initially, whether auxiliary device 204 is authorized to connect with client computing device 202. For example, computing device 202 may be governed by a device policy that, for example, includes a whitelist of devices and/or types of devices that are approved for use with computing device 202 and/or a blacklist of devices and/or types of devices that are not approved for use with client computing device 202. In some embodiments, if device identifier 206 matches a blacklisted device identifier and/or does not match a whitelisted device identifier, auxiliary device 204 may be blocked from interfacing with client computing device 202 and no further action may be taken to identify and/or authenticate auxiliary device 204. On the other hand, if device identifier 206 matches a whitelisted device identifier and/or does not match a blacklisted device identifier, the limited connection between client computing device 202 and auxiliary device 204 may continue for purposes of further identifying and/or authenticating auxiliary device 204.

In some embodiments, further identification and/or authentication of auxiliary device 204 may be used to determine whether auxiliary device 204 has functionalities in addition to and/or separate from those indicated by device identifier 206 and/or to determine whether functionalities of auxiliary device 204 match an approved set of functionalities for an auxiliary device connected to client computing device 202. For example, device identifier 206 may indicate that auxiliary device 204 has a specified set of functionalities. However, device identifier 206 may include one or more spoofed attributes that do not accurately indicate the functionalities of auxiliary device 204. For example, device identifier 206 may indicate that auxiliary device 204 is a webcam device with video functionalities. However, auxiliary device 204 may also include storage functionalities that are not indicated by device identifier 206. In some embodiments, device identifier 206 may reflect functionalities of a first configuration of auxiliary device 204, but may not reflect functionalities of one or more other configurations of auxiliary device 204. In one embodiment, as will be described in greater detail below, device identifier 206 may be used to select one or more drivers for interfacing with auxiliary device 204.

At step 306 in FIG. 3, one or more of the systems described herein may determine, at the client computing device, whether the set of functionality descriptors matches a set of reference descriptors. For example, determination module 108 may, as part of client computing device 202 in FIG. 2, determine whether the set of functionality descriptors 208 matches a set of reference descriptors 210.

Determination module 108 may determine whether the set of functionality descriptors 208 matches the set of reference descriptors 210 in a variety of ways. In some embodiments, client computing device 202 may include one or more sets of reference descriptors 210, and/or may have access (e.g., via a network and/or connected storage device) to one or more stored sets of reference descriptors 210, that correspond to sets of functionality descriptors for one or more auxiliary devices that are authorized to connect with client computing device 202, such as sets of reference descriptors 210 corresponding to whitelisted auxiliary devices and/or types of devices. In one embodiment, client computing device 202 may include one or more sets of reference descriptors 210, and/or may have access one or more stored sets of reference descriptors 210, that correspond to sets of functionality descriptors for one or more auxiliary devices that are not authorized to connect with client computing device 202, such as sets of reference descriptors 210 corresponding to blacklisted auxiliary devices and/or types of auxiliary devices.

In at least one embodiment, the one or more sets of reference descriptors 210 may be used to determine whether a set of functionalities of an auxiliary device corresponds to a set of device functionalities indicated by a device identifier for the auxiliary device. For example, device identifier 206 received by communication module 106 from auxiliary device 204 may indicate that auxiliary device 204 has a specified set of functionalities corresponding to a particular set of reference descriptors 210. However, the set of functionality descriptors 208 received by communication module 106 from auxiliary device 204 may not match the particular set of reference descriptors 210, indicating that device identifier 206 may represent a spoofed device identifier 206.

At step 308 in FIG. 3, one or more of the systems described herein may perform, at the client computing device, a security action based on the determination of whether the set of functionality descriptors matches the set of reference descriptors. For example, security module 110 may, as part of client computing device 202 in FIG. 2, perform a security action based on the determination of whether the set of functionality descriptors 208 matches the set of reference descriptors 210.

Security module 110 may perform the security action in a variety of ways. In one example, performing the security action may further include preventing, at the client computing device, the auxiliary device from interfacing with the client computing device based on a determination that the set of functionality descriptors does not match the set of reference descriptors. For example, if determination module 108 determines that the set of functionality descriptors 208 does not match the set of reference descriptors 210, security module 110 may, as part of client computing device 202, prevent auxiliary device 204 from interfacing with client computing device 202 based on the determination that the set of functionality descriptors 208 does not match the set of reference descriptors 210. Security module 110 may, for example, determine that auxiliary device 204 is not authorized to connect to client computing device 202 based on the determination that the set of functionality descriptors 208 received from auxiliary device 204 does not match the set of reference descriptors 210. Security module 110 may then prevent auxiliary device 204 from further interfacing with client computing device 202 by, for example, blocking auxiliary device 204 from interfacing with a function driver of client computing device 202.

In at least one embodiment, security module 110 may prevent auxiliary device 204 from interfacing with client computing device 202 based on a determination that the set of functionality descriptors 208 matches the set of reference descriptors 210 when, for example, the matching set of reference descriptors 210 corresponds to a blacklisted device. In some embodiments, a device policy for client computing device 202 may prevent client computing device 202 from connecting with any auxiliary device 204 having certain functionalities. For example, if one or more functionality descriptors 208 of the set of functionality descriptors 208 received by communication module 106 match a reference descriptor 210 (e.g., a reference descriptor indicating a data storage functionality, hub device functionality, etc.) that is blacklisted, security module 110 may block auxiliary device 204 from interfacing with client computing device 202.

In some embodiments, performing the security action may include allowing, at the client computing device, the auxiliary device to interface with the client computing device based on a determination that the set of functionality descriptors matches the set of reference descriptors. For example, if determination module 108 determines that the set of functionality descriptors 208 matches the set of reference descriptors 210, security module 110 may, as part of client computing device 202, allow auxiliary device 204 to interface with client computing device 202 based on the determination that the set of functionality descriptors 208 matches the set of reference descriptors 210, such as, for example, when the set of reference descriptors 210 correspond to a whitelisted device and/or when the set of reference descriptors 210 correspond to a set of functionalities for auxiliary device 204 indicated by device identifier 206. Security module 110 may, for example, determine that auxiliary device 204 is authorized to connect to client computing device 202 based on the match and may allow auxiliary device 204 to interface with client computing device 202 via, for example, a function driver of client computing device 202, as will be explained in greater detail below.

Security module 110 may also perform any other suitable security action to protect client computing device 202 and/or any other device connected to client computing device 202. For example, security module 110 may perform a security action to prevent a user from accessing client computing device 202 and/or attempting to connect additional devices to client computing device 202 for at least a specified period of time and/or until appropriate credentials are supplied by the user. Additionally, security module 110 may warn the user and/or an administrator about the increased security risk presented by auxiliary device 204 and/or increase monitoring of auxiliary device connections to client computing device 202. In addition, security module 110 may blacklist auxiliary device 204 and/or related devices (e.g., devices from the same vendor or manufacturer as auxiliary device 204, etc.)

One or more of the systems described herein may subsequently receive, at the client computing device, a set of subsequent functionality descriptors from the auxiliary device, each subsequent functionality descriptor of the set of subsequent functionality descriptors identifying a separate functionality of the auxiliary device. For example, after auxiliary device 204 has been permitted to interface with client computing device 202, communication module 106 may send a subsequent command to auxiliary device 204 requesting an additional set of functionality descriptors from auxiliary device 204. Communication module 106 may, for example, send the subsequent command to auxiliary device 204 after a specified period of time has elapsed and/or or periodically. In some embodiments, communication module 106 may send the subsequent command to auxiliary device 204 in response to an event, such as after a specified action has occurred and/or in response to potentially suspicious behavior detected in relation to connected auxiliary device 204 (e.g., auxiliary device 204 interfacing with client computing device 202 in an unexpected manner, etc.). In at least one embodiment, communication module 106 may send the subsequent command to auxiliary device 204 in response detecting unexpected interface behavior between client computing device 202 and auxiliary device 204, such as unexpected signal timing behavior, unexpected input/output control behavior, behavior changes over time, and/or any other any other identifiable behavioral inconsistencies, without limitation.

In response to the subsequent command, auxiliary device 204 may send a set of subsequent functionality descriptors 208 to communication module 106. The set of subsequent functionality descriptors 208 received from auxiliary device 204 may match the set of functionality descriptors 208 previously received by communication module 106 at, for example, step 304 as described above. In some examples, however, the set of subsequent functionality descriptors 208 may differ from the previously received set of functionality descriptors 208, as will be described in greater detail below.

One or more of the systems described herein may determine, at the client computing device, whether the set of subsequent functionality descriptors matches the set of reference descriptors. For example, determination module 108 may, as part of client computing device 202 in FIG. 2, determine whether the set of subsequent functionality descriptors 208 matches the set of reference descriptors 210, which was previously determined to match the set of functionality descriptors 208 received earlier from auxiliary device 204. If the set of subsequent functionality descriptors 208 received from auxiliary device 204 does not match the set of reference descriptors 210, such a disparity may provide an indication that auxiliary device 204 changed from an original configuration to another configuration having additional functionalities that were not previously identified by the earlier received set of functionality descriptors 208. In at least one example, determination module 108 may determine whether the set of subsequent functionality descriptors 208 matches another set of reference descriptors 210, such as another set of reference descriptors 210 corresponding to an approved auxiliary device and/or auxiliary device type, indicating that auxiliary device 204 changed to another configuration that is an authorized configuration.

In various embodiments, one or more of the systems described herein may perform, at the client computing device, an additional security action based on the determination of whether the set of subsequent functionality descriptors matches the set of reference descriptors. For example, security module 110 may, as part of client computing device 202 in FIG. 2, perform an additional security action based on the determination of whether the set of subsequent functionality descriptors 208 matches the set of reference descriptors 210.

Security module 110 may perform the additional security action in a variety of ways. For example, if determination module 108 determines that the set of subsequent functionality descriptors 208 does not match the set of reference descriptors 210, security module 110 may, as part of client computing device 202, prevent auxiliary device 204 from further interfacing with client computing device 202 based on the determination that the set of subsequent functionality descriptors 208 does not match the set of reference descriptors 210. However, if determination module 108 determines that the set of subsequent functionality descriptors 208 matches the set of reference descriptors 210, security module 110 may, as part of client computing device 202, allow auxiliary device 204 to continue interfacing with client computing device 202 based on the determination that the set of subsequent functionality descriptors 208 does indeed match the set of reference descriptors 210.

FIG. 4 is a block diagram of an additional example computing system 400 for controlling auxiliary device access to computing devices based on device functionality descriptors. As shown in FIG. 4, system 400 may include a client computing device 402 in communication with a connected auxiliary device 404 via any suitable port and/or wireless connection protocol. For example, client computing device 402 may be in communication with auxiliary device 404 via a USB port connection. In one example, all or a portion of the functionality of modules 102 may be performed by client computing device 402 and/or any other suitable computing system. Client computing device 402 may include reference descriptors 210, which may be used to identify an auxiliary device, such as auxiliary device 404, connected to client computing device 402. For example, a set of reference descriptors 210 may be used for comparison with a set of functionality descriptors, such as a set of interface descriptors (e.g., one or more of interface descriptors 424A, 424B, and 424C), received from connected auxiliary device 404.

Client computing device 402 may also include drivers 410 for interfacing with auxiliary device 404. For example, client computing device 402 may include at least one filter driver 412, at least one bus driver 414, and at least one function driver 416. One or more of drivers 410 may be installed on client computing device 402 prior to connecting with auxiliary device 404 and/or may be installed following an initial connection of auxiliary device 404 to client computing device 402. For example, after physically connecting auxiliary device 404 to client computing device 402, one or more drivers may be located, downloaded, and installed on client computing device 402 based on a device identifier (e.g., device descriptor 420) for auxiliary device 404.

Auxiliary device 404 may include a device identifier, such as device descriptor 420, that includes a vendor identifier, a product identifier, a device class identifier, and/or a system-defined device setup class for auxiliary device 404 and/or a type of device for auxiliary device 404. Additionally, auxiliary device 404 may include one or more configuration descriptors, such a first configuration descriptor 422A and second configuration descriptor 422B, that provide configuration information for one or more configurations for auxiliary device 404. For example, first configuration descriptor 422A and second configuration descriptor 422B may include information corresponding, respectively, to a first configuration and a second configuration for auxiliary device 404. Auxiliary device 404 may additionally include one or more functionality descriptors, such as interface descriptor 424A, interface descriptor 424B, and interface descriptor 424C. Each of interface descriptors 424A-424C may correspond to a separate interface that includes a grouping of endpoints for carrying out a specified functionality of auxiliary device 404. For example, an interface corresponding to interface descriptor 424A may have an audio functionality, an interface corresponding to interface descriptor 424B may have a video functionality, and an interface corresponding to interface descriptor 424C may have a data storage functionality. Interface descriptors 424A-424C may each include information related to the corresponding interface functionalities. Such information may include, for example, class codes, such as USB class codes, for each of the corresponding interfaces.

As shown in FIG. 4, different combinations of interface descriptors may be utilized in different configurations corresponding to each of first configuration descriptor 422A and second configuration descriptor 422B. For example, a first configuration corresponding to first configuration descriptor 422A may include interface descriptor 424A and interface descriptor 424B, and a second configuration corresponding to second configuration descriptor 422B may include both interface descriptor 424A and interface descriptor 424B, and may additionally include interface descriptor 424C. In some embodiments, device descriptor 420 may only indicate device functionalities corresponding to the first configuration that includes only interfaces identified by interface descriptor 424A (e.g., audio functionality) and interface descriptor 424B (e.g., video functionality). Device descriptor 420 may not, however, indicate a device functionality corresponding to interface descriptor 424C (e.g., data storage functionality). In one embodiment, device descriptor 420 may be a spoofed device descriptor that does not identify, or incorrectly identifies, one or more functionalities of interfaces on auxiliary device 404.

In at least one embodiment, one or more of the systems described herein may select, at the client computing device, a driver based on the device identifier. For example, selection module 112 may, as part of client computing device 402, select a driver, such as filter driver 412, bus driver 414, and/or function driver 416, based on the device descriptor 420 of auxiliary device 404. In some embodiments, at least one of drivers 410 (e.g., function driver 416) may be installed based on one or more of interface descriptors 424A-424C received from auxiliary device 404.

One or more of the systems described herein may then send, from the client computing device, a command from the driver to the auxiliary device requesting the set of functionality descriptors from the auxiliary device. For example, communication module 106 may, as part of client computing device 402, send a command from a driver, such as filter driver 412, to auxiliary device 404 requesting a set of functionality descriptors, such as one or more of interface descriptors 424A-424C, from auxiliary device 404. In some embodiments, filter driver 412 may be an upper filter that operates in kernel mode and that is configured to interface with auxiliary device 404 without allowing function driver 416 to interface with auxiliary device 404. In some embodiments, an operating system of client computing device 402 may notify filter driver 412 that auxiliary device 404 has been connected to client computing device 402 using, for example, a synchronous callback. In response to the callback, filter driver 412 may send the command to auxiliary device 404 requesting the set of interface descriptors for auxiliary device 404.

One or more of the systems described herein may then receive, at the client computing device, the set of functionality descriptors in response to the command. For example, communication module 106 may, as part of client computing device 402, receive in response to the command, one or more interface descriptors 424A-424C. For example, auxiliary device 404 may return all of interface descriptors 424A-424C to filter driver 416. In some embodiments, auxiliary device 404 may return only some interface descriptors, such as only those interface descriptors related to an active or default configuration. For example, auxiliary device 404 may return only interface descriptors corresponding to first configuration descriptor 422A, such as interface descriptor 424A and interface descriptor 424B, but not interface descriptor 424C corresponding to second configuration descriptor 422B. In some embodiments, a second configuration related to second configuration descriptor 422B may be activated after a predetermined time interval following connection of auxiliary device 404 to client computing device 402 and/or after a specified event has occurred (e.g., after a particular command or signal is received from client computing device 402 and/or from another source separate from client computing device 402 but connected to auxiliary device 404).

As described above, one or more of the systems described herein may determine, at the client computing device, whether the set of functionality descriptors matches a set of reference descriptors. For example, determination module 108 may, as part of client computing device 402 in FIG. 2, determine whether the set of functionality descriptors, such as interface descriptors 424A, 424B, and/or 424C received from auxiliary device 404 and/or a set of class codes from interface descriptors 424A, 424B, and/or 424C, matches a set of reference descriptors 210.

As described above, one or more of the systems described herein may then perform, at the client computing device, a security action based on the determination of whether the set of functionality descriptors matches the set of reference descriptors. For example, security module 110 may, as part of client computing device 402, perform a security action based on the determination of whether the set of functionality descriptors (i.e., interface descriptors 424A, 424B, and/or 424C and/or corresponding class codes) received from auxiliary device 404 matches the set of reference descriptors 210. For example, if determination module 108 determines that the set of functionality descriptors received from auxiliary device 404 does not match the set of reference descriptors 210, security module 110 may, as part of client computing device 402, prevent auxiliary device 404 from further interfacing with client computing device 402 based on the determination that the set of functionality descriptors does not match the set of reference descriptors 210. For example, security module 110 may block function driver 416 from interfacing with auxiliary device 404. Security module 110 may also perform any other suitable security action as described herein.

In at least one embodiment, if determination module 108 determines that the set of functionality descriptors (i.e., interface descriptors 424A, 424B, and/or 424C and/or corresponding class codes) matches the set of reference descriptors 210, security module 110 may, as part of client computing device 402, allow auxiliary device 404 to interface with client computing device 402 based on the determination that the set of functionality descriptors matches the set of reference descriptors 210. For example, security module 110 may allow bus driver 414 to interface with both an operating system of client computing device 402 and function driver 416, and function driver 416 may interface with auxiliary device 404.

In some embodiments, after auxiliary device 404 has been permitted to interface with client computing device 402 via, for example, function driver 416, communication module 106 may, as part of client computing device 402, send a subsequent command to auxiliary device 404 requesting an additional set of functionality descriptors from auxiliary device 404, either after a specified time and/or in response to an event, such as suspicious activity, as described in greater detail above.

In one embodiment, in the internet of things (IOT) world, a device security solution may identify various auxiliary devices, sensors, and/or monitors and manage their access to sensitive and non-sensitive data. While a proposed solution may be described in relation to USB devices and ports, the methods and systems described herein may be extendable to any physical hardware port available on a host computer and may be extendable to wireless connection protocols.

Some solutions (e.g. USB Filter from Microsoft) may provide whitelisting of auxiliary devices based on device attributes, such as a device class IDs, vendor IDs, and/or product IDs. Extending these capabilities further, the methods and systems described herein may provide a solution that further enforces security based on a notion of device identity. For example, determining a correct device identity may be very important since auxiliary devices may often be easily spoofed for certain device attributes, such as vendor ID and product ID. A spoofed device may expose and/or present an additional unwanted and/or malicious configuration along with a valid configuration. For example, a webcam device typically exposes two interfaces (i.e., audio and video interfaces). A spoofed webcam device may expose additional interfaces, such as a storage interface, that may be used for malicious intent.

In general, each USB device may have one or more configurations (described by corresponding configuration descriptors) that govern how the USB device behaves, and each configuration may embody one or more interfaces (described by corresponding interface descriptors) that prescribe how software should access the device hardware. Accordingly, the configuration descriptors and/or interface descriptors may be used to identify a device's functionality and to nominally load a device driver (e.g., a function driver) based on that functionality. In some embodiments, the interface descriptors may be described in terms of class codes (as defined by USB specifications). The systems and methods described herein may utilize these class codes to construct the device identity for the attached auxiliary device.

Drivers may be classified, for example, based on system-defined device setup classes that may be identified by an operating system (e.g., MICROSOFT WINDOWS) of a host computing device. In the IOT world, a host computer may work with a fixed set of devices. Hence an install time administrator would know about what kinds of devices the host computer would interact with. Accordingly, the methods and systems described herein may readily determine under which device setup class a device would fall and install a corresponding kernel mode driver as an upper filter to that class. When a new device is plugged into the host computer, the operating system may notify the filter driver about the newly added device with help of a synchronous callback. In this callback, the device identity may be determined and compared with policy defined device identity data (e.g., a set of reference class codes). If a match is found, such a match would indicate that the device is authentic, and the connected device would simply be permitted to interface with the host computer. If the match fails, then the device might be blacklisted and blocked (e.g., in IRP_MJ_START).

As explained above in connection with method 300 in FIG. 3, the systems and methods described herein may enable protection of client computing devices from loss of sensitive data to malicious devices that may appear to be legitimate auxiliary devices. The systems and methods described herein may improve the functioning of client computing devices by allowing legitimate auxiliary devices to interface with the client computing devices while blocking unauthorized auxiliary devices that may be used to obtain data without a user's knowledge. These systems and methods may accordingly improve the security of client computing devices and reduce data losses to malicious parties. Additionally, the disclosed systems and methods may safeguard client computing devices from malicious attacks without resorting to blocking all auxiliary device connections through physical locks and blocking software, which would negatively impact the usability of the computing devices and result in significantly reduced user experiences. The systems and methods described herein may further provide granular control over connections of composite device having multiple configurations. Additionally, by identifying auxiliary devices based on device functionality descriptors, such as interface descriptors or class codes for the auxiliary devices, rather than merely relying on device descriptors for the devices, the described systems and methods may provide accurate identification and characterization of the devices, even when the device descriptors, such as vendor ID and product ID, are spoofed.

Figure 5:
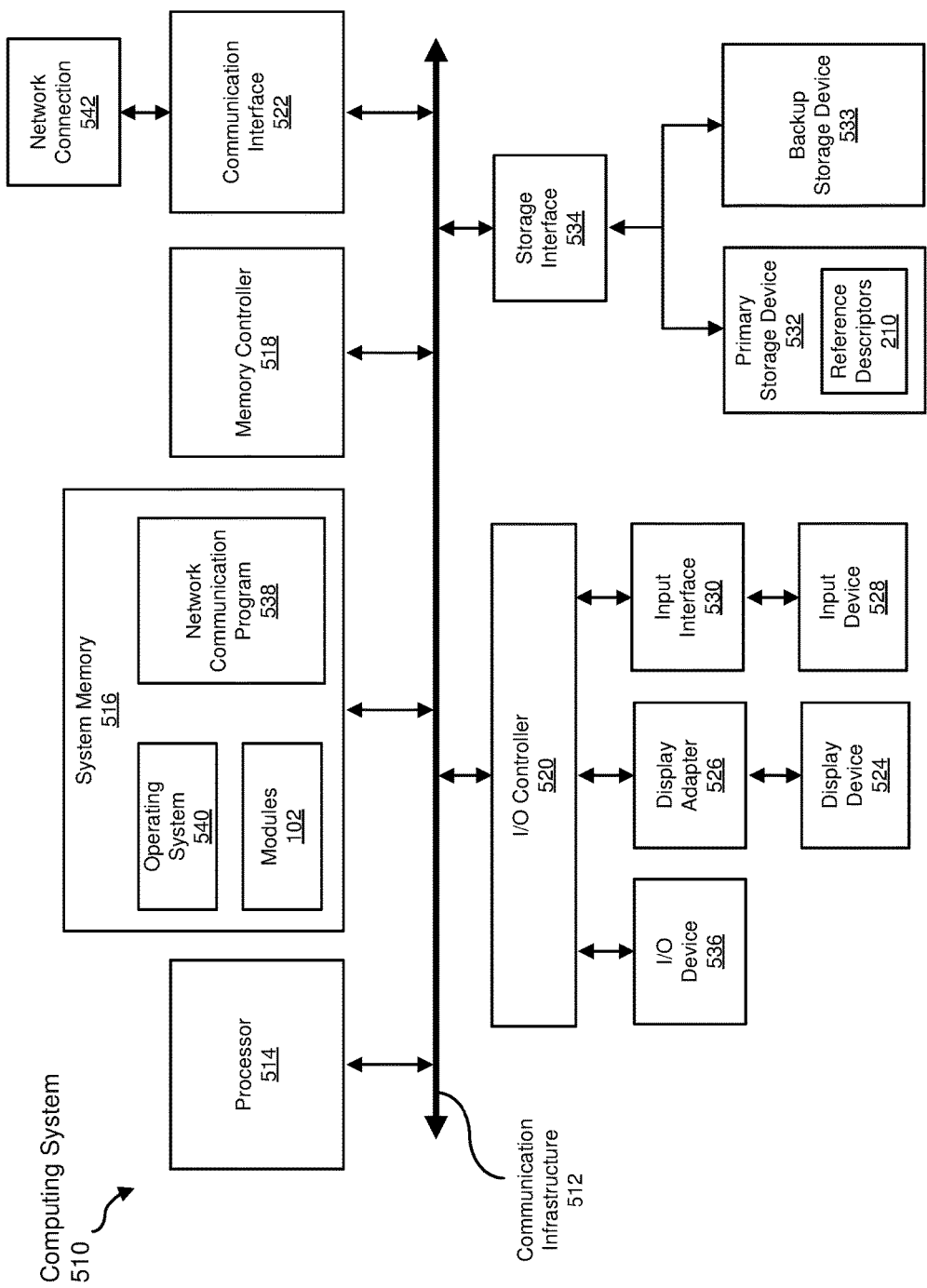
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, reference descriptors from FIG. 2 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
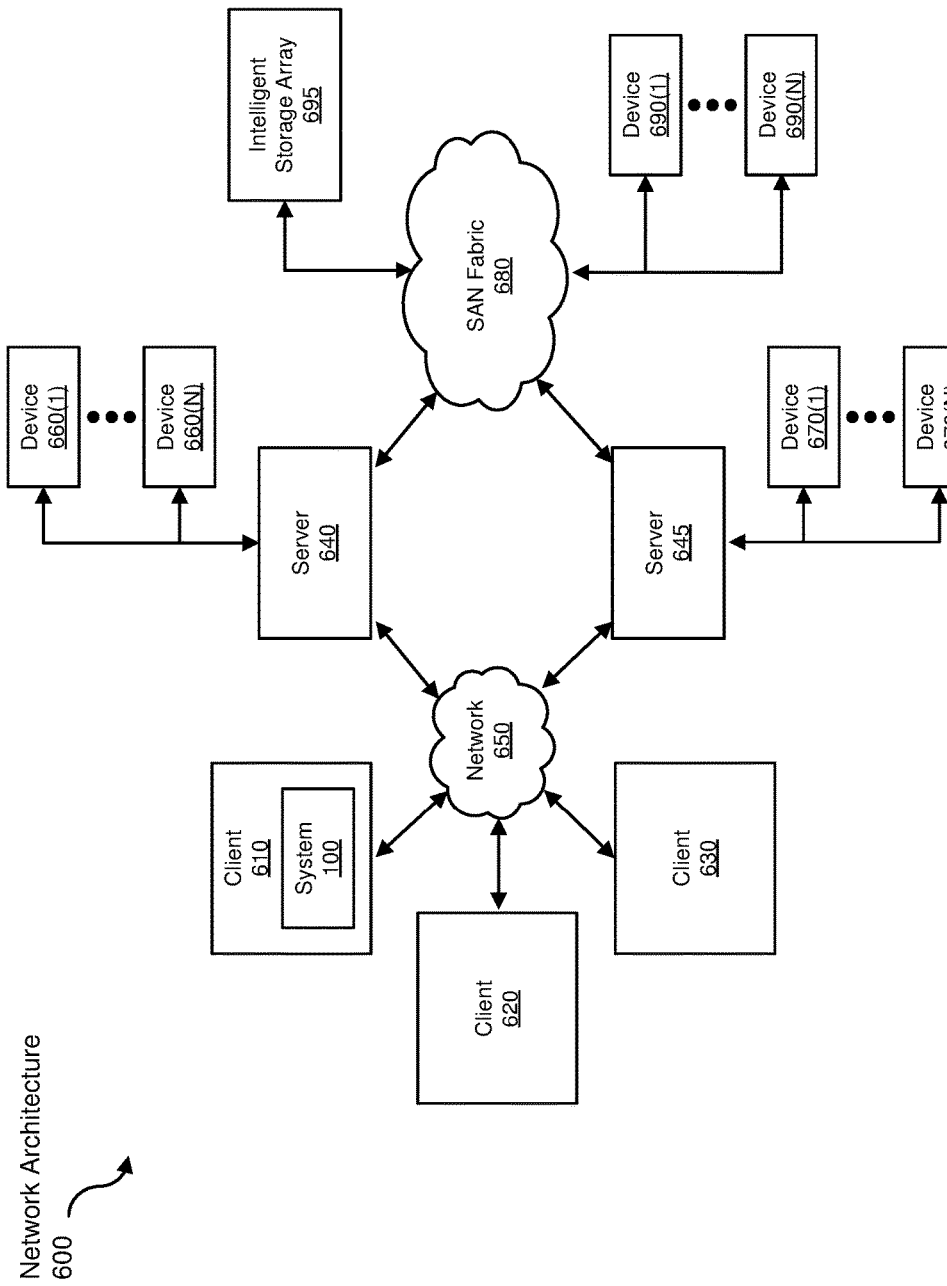
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for controlling auxiliary device access to computing devices based on device functionality descriptors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive functionality descriptor data from a connected auxiliary device to be transformed, transform the functionality descriptor data into a set of identifying data corresponding to the auxiliary device, use the result of the transformation to identify and/or authorize the auxiliary device, and store the result of the transformation to a client computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling auxiliary device access to computing devices based on device functionality descriptors, at least a portion of the method being performed by a client computing device comprising at least one processor, the method comprising:
   detecting, at the client computing device, a connection of an auxiliary device to the client computing device;
   receiving, at the client computing device, a set of functionality descriptors from the auxiliary device, each functionality descriptor of the set of functionality descriptors identifying a separate functionality of the auxiliary device;
   determining, at the client computing device, whether the set of functionality descriptors matches a set of reference descriptors;
   performing, at the client computing device, a security action based on the determination of whether the set of functionality descriptors matches the set of reference descriptors;
   receiving, at the client computing device, a set of subsequent functionality descriptors from the auxiliary device, each subsequent functionality descriptor of the set of subsequent functionality descriptors identifying a separate functionality of the auxiliary device;
   determining, at the client computing device, whether the set of subsequent functionality descriptors matches the set of reference descriptors; and
   performing, at the client computing device, an additional security action based on the determination of whether the set of subsequent functionality descriptors matches the set of reference descriptors.

2. The computer-implemented method of claim 1, further comprising receiving, at the client computing device, a device identifier from the auxiliary device.

3. The computer-implemented method of claim 2, further comprising:
   selecting, at the client computing device, a driver based on the device identifier; and
   sending, from the client computing device, a command from the driver to the auxiliary device requesting the set of functionality descriptors from the auxiliary device;
   wherein receiving the set of functionality descriptors from the auxiliary device comprises receiving, at the client computing device, the set of functionality descriptors in response to the command.

4. The computer-implemented method of claim 3, wherein the driver comprises a kernel-mode filter driver.

5. The computer-implemented method of claim 2, wherein the device identifier comprises at least one of a vendor identifier, a product identifier, and a device class identifier according to at least one of a specification and a standard for the auxiliary device.

6. The computer-implemented method of claim 2, wherein the device identifier is mapped to a corresponding entity that is recognizable by an operating system of the client computing device.

7. The computer-implemented method of claim 2, wherein the set of reference descriptors corresponds to the device identifier.

8. The computer-implemented method of claim 1, wherein each functionality descriptor of the set of functionality descriptors comprises an interface descriptor for the auxiliary device.

9. The computer-implemented method of claim 1, wherein each functionality descriptor of the set of functionality descriptors comprises a class code according to at least one of a specification and a standard for the auxiliary device.

10. The computer-implemented method of claim 9, wherein the class code comprises a universal serial bus class code corresponding to a universal serial bus standard for the auxiliary device.

11. The computer-implemented method of claim 1, wherein:
    determining whether the set of functionality descriptors matches the set of reference descriptors further comprises determining, at the client computing device, that the set of functionality descriptors does not match the set of reference descriptors; and
    performing the security action further comprises preventing, at the client computing device, the auxiliary device from interfacing with the client computing device based on the determination that the set of functionality descriptors does not match the set of reference descriptors.

12. The computer-implemented method of claim 11, wherein preventing the auxiliary device from interfacing with the client computing device further comprises preventing, at the client computing device, a function driver of the client computing device from interfacing with the auxiliary device.

13. The computer-implemented method of claim 1, wherein:
    determining whether the set of functionality descriptors matches the set of reference descriptors further comprises determining, at the client computing device, that the set of functionality descriptors matches the set of reference descriptors; and
    performing the security action further comprises allowing, at the client computing device, the auxiliary device to interface with the client computing device based on the determination that the set of functionality descriptors matches the set of reference descriptors.

14. The computer-implemented method of claim 13, further comprising:
    requesting, by the client computing device, the set of subsequent functionality descriptors from the auxiliary device in response to at least one of an event and an elapse of a specified time.

15. The computer-implemented method of claim 14, wherein:
    determining whether the set of subsequent functionality descriptors matches the set of reference descriptors further comprises determining, at the client computing device, that the set of subsequent functionality descriptors does not match the set of reference descriptors; and
    performing the security action further comprises preventing, at the client computing device, the auxiliary device from interfacing with the client computing device based on the determination that the set of subsequent functionality descriptors does not match the set of reference descriptors.

16. The computer-implemented method of claim 1, further comprising sending, from the client computing device, a command to the auxiliary device requesting the set of functionality descriptors from the auxiliary device;
    wherein receiving the set of functionality descriptors from the auxiliary device comprises receiving, at the client computing device, the set of functionality descriptors in response to the command.

17. A system for controlling auxiliary device access to computing devices based on device functionality descriptors, the system comprising:
- a detection module, stored in memory, that detects, at a client computing device, a connection of an auxiliary device to the client computing device;
- a communication module, stored in memory, that:
  - receives, at the client computing device, a set of functionality descriptors from the auxiliary device, each functionality descriptor of the set of functionality descriptors identifying a separate functionality of the auxiliary device, and
  - receives, at the client computing device, a set of subsequent functionality descriptors from the auxiliary device, each subsequent functionality descriptor of the set of subsequent functionality descriptors identifying a separate functionality of the auxiliary device;
- a determination module, stored in memory, that:
  - determines, at the client computing device, whether the set of functionality descriptors matches a set of reference descriptors, and
  - determines, at the client computing device, whether the set of subsequent functionality descriptors matches the set of reference descriptors;
- a security module, stored in memory, that:
  - performs, at the client computing device, a security action based on the determination of whether the set of functionality descriptors matches the set of reference descriptors, and
  - performs, at the client computing device, an additional security action based on the determination of whether the set of subsequent functionality descriptors matches the set of reference descriptors; and
- at least one hardware processor that executes the detection module, the communication module, the determination module, and the security module.

18. The system of claim 17, wherein the communication module further receives, at the client computing device, a device identifier from the auxiliary device.

19. The system of claim 18, further comprising a selection module, stored in memory, that selects, at the client computing device, a driver based on the device identifier;
- wherein the communication module further sends, from the client computing device, a command from the driver to the auxiliary device requesting the set of functionality descriptors from the auxiliary device; and
- wherein receiving the set of functionality descriptors from the auxiliary device comprises receiving, at the client computing device, the set of functionality descriptors in response to the command.

20. A non-transitory computer-readable medium comprising one or more computer-executable instructions that, when executed by at least one processor of a client computing device, cause the client computing device to:
- detect, at the client computing device, a connection of an auxiliary device to the client computing device;
- receive, at the client computing device, a set of functionality descriptors from the auxiliary device, each functionality descriptor of the set of functionality descriptors identifying a separate functionality of the auxiliary device;
- determine, at the client computing device, whether the set of functionality descriptors matches a set of reference descriptors;
- perform, at the client computing device, a security action based on the determination of whether the set of functionality descriptors matches the set of reference descriptors;
- receive, at the client computing device, a set of subsequent functionality descriptors from the auxiliary device, each subsequent functionality descriptor of the set of subsequent functionality descriptors identifying a separate functionality of the auxiliary device;
- determine, at the client computing device, whether the set of subsequent functionality descriptors matches the set of reference descriptors; and
- perform, at the client computing device, an additional security action based on the determination of whether the set of subsequent functionality descriptors matches the set of reference descriptors.

* * * * *